United States Patent [19]
Richardson, Jr.

[11] Patent Number: 6,008,453
[45] Date of Patent: Dec. 28, 1999

[54] TRANSMISSION LINE SPACER-TWISTER DEVICE

[76] Inventor: Albert S. Richardson, Jr., 3 Wingate Rd., Lexington, Mass. 02173

[21] Appl. No.: 09/007,633

[22] Filed: Jan. 15, 1998

Related U.S. Application Data

[63] Continuation-in-part of application No. 08/593,073, Jan. 29, 1996, Pat. No. 5,721,393, which is a continuation-in-part of application No. 08/274,954, Jul. 14, 1994, Pat. No. 5,488,197, which is a continuation of application No. 08/061,183, May 13, 1993, Pat. No. 5,362,920.

[51] Int. Cl.$^6$ ....................................................... H02G 7/14
[52] U.S. Cl. ............................................. 174/42; 174/146
[58] Field of Search ................................. 174/42, 40 R, 174/146, 43, 44, 160, 168

[56] References Cited

U.S. PATENT DOCUMENTS

| | | | |
|---|---|---|---|
| 545,819 | 9/1895 | Rothenberger | 174/168 |
| 601,412 | 3/1898 | Canfield | 174/168 |
| 3,032,605 | 5/1962 | Gerlach et al. | 174/128.1 |
| 3,971,881 | 7/1976 | Hawkins | 174/42 |
| 4,421,959 | 12/1983 | Chen et al. | 200/16 A |
| 4,777,327 | 10/1988 | Richardson, Jr. | 174/42 |

OTHER PUBLICATIONS

"Phase–to–Phase Spacers (Figure 2)", 2 pages (1981), No month.

"Pultruded Fiberglass Reinforced Plastic Rod Data Sheet," pp. F–1, F–2, F–3, F–5 and F–8, Hughes Brothers, Inc. (1995), No month.

"Controlling Galloping on Transmission Lines," pp. 4–5, Recherche et Developpement Institut de recherche d'Hydro–Quebec, vol. 11, No. 2, Spring–Summer 1997, No month.

"Deadend, Suspension & Line Post Insulators for 15–69kV Applications," 5 pages, brochure from Ohio Brass (Oct., 1996), No month.

"AR Spacer/Twister," AR Products Catalog, pp. 34–41 (1997), No month.

"1996–97 Directory of Missouri Electric Cooperatives," top page and pp. 44–45, No month.

Purchase Order of First Sale, date issued Jan. 28, 1997.

*Primary Examiner*—Dean A. Reichard
*Assistant Examiner*—Dhiru R Patel
*Attorney, Agent, or Firm*—Hamilton, Brook, Smith & Reynolds, P.C.

[57] ABSTRACT

A spacer-twister device for securing to first and second conductors includes an elongate insulating member having first and second ends. A first clamp is rotatably coupled to the first end of the insulating member by a first joint for gripping the first conductor. A second clamp is rotatably coupled to the second end of the insulating member by a second joint for gripping the second conductor. The insulating member provides proper spacing between the first and second conductors with the first and second joints allowing twisting of the first and second conductors. In turn, the twisting prevents or dampens galloping of the conductors.

13 Claims, 16 Drawing Sheets

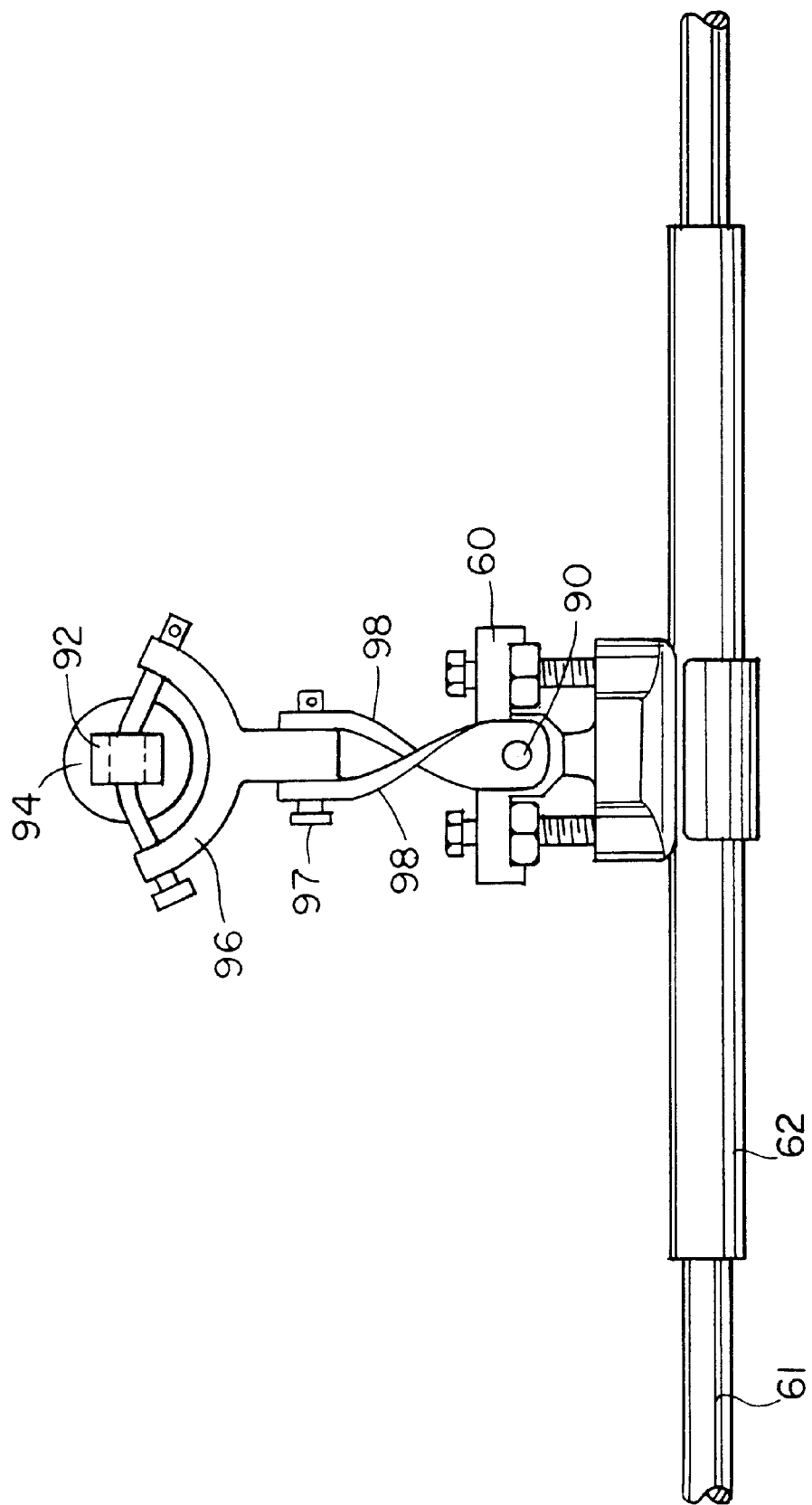

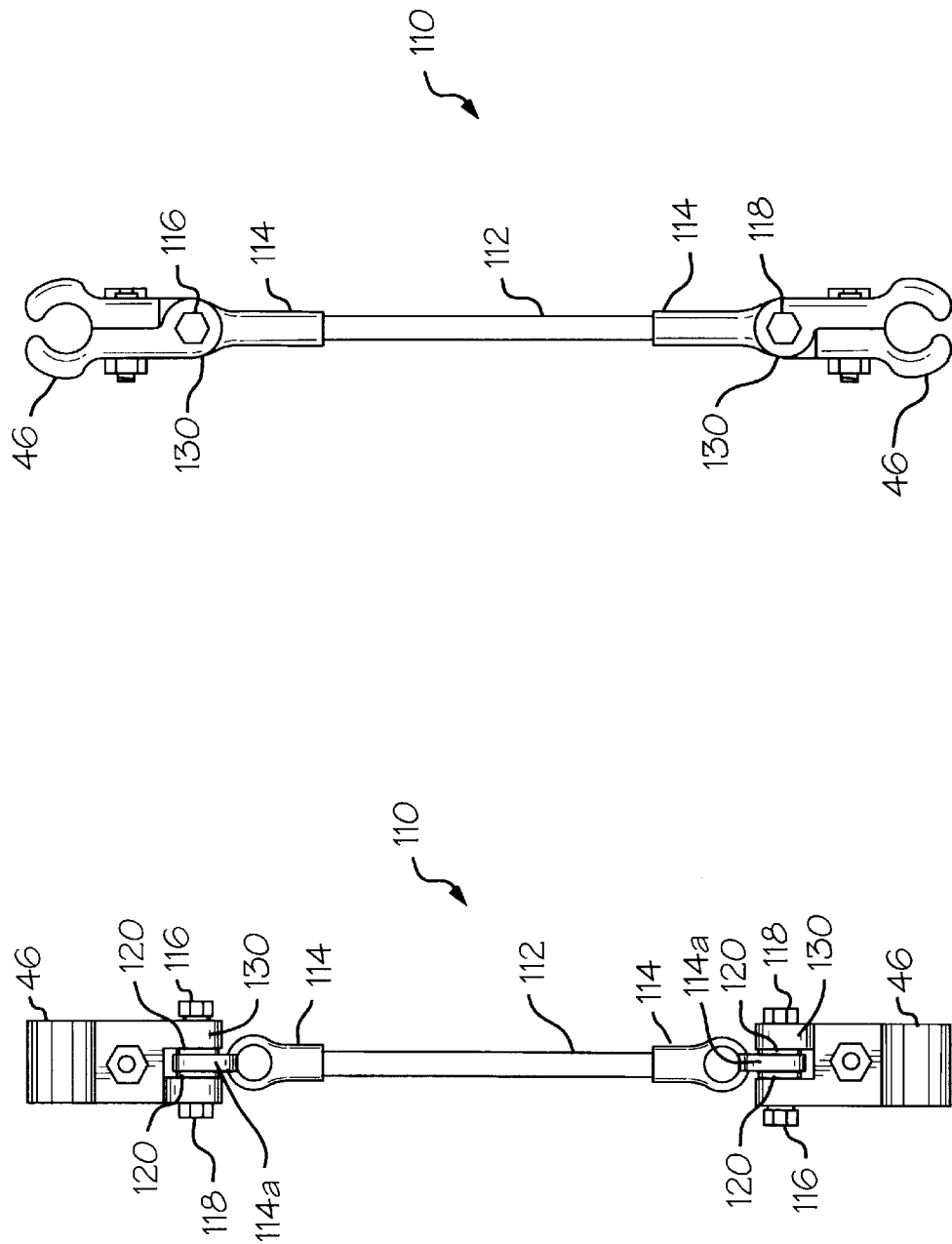

6,008,453

TRANSMISSION LINE SPACER-TWISTER DEVICE

RELATED APPLICATIONS

This application is a continuation-in-part of application Ser. No. 08/593,073 filed Jan. 29, 1996 now U.S. Pat. No. 5,721,393, which is a continuation-in-part of U.S. Ser. No. 08/274,954 filed Jul. 14, 1994, now U.S. Pat. No. 5,488,197, which is a continuation of U.S. Ser. No. 08/061,183 filed May 13, 1993, now U.S. Pat. No. 5,362,920, all are incorporated herein by reference in their entirety.

BACKGROUND OF THE INVENTION

During winter weather conditions, ice can form on the conductors of electrical power transmission lines. This ice sometimes behaves as an air foil when the wind passes over the conductors. Occasionally, when wind conditions allow, the air foil ice formations exert lifting forces on the conductors which causes the conductors to gallop. Such galloping can result in short circuits. If an electrical power transmission line provides service to a region including business centers, hospitals, major manufacturing plants or airport operations, protection against such galloping is desirable to prevent power interruption.

SUMMARY OF THE INVENTION

The present invention is directed to a spacer-twister device for properly spacing and preventing galloping of conductors. The spacer-twister device is securable to first and second conductors and includes an elongate insulating member having first and second ends. A first clamp is rotatably coupled to the first end of the insulating member by a first joint, the first clamp for gripping the first conductor. A second clamp is rotatably coupled to the second end of the insulating member by a second joint for gripping the second conductor. The insulating member provides proper spacing between the first and second conductors with the first and second joints allowing twisting of the first and second conductors which prevents galloping. By allowing twisting of the conductors, the air foil ice formation is twisted into a position where there is little or no lift caused by the wind passing over the ice formation on the conductors.

In preferred embodiments, the insulating member includes a first eyelet at the first end and a second eyelet at the second end. The first and second clamps each have a pair of mounting flanges. The first and second eyelets are each rotatably coupled between the mounting flanges of respective first and second clamps by a bolt to form the first and second joints. The first and second joints preferably further include washers positioned on opposite sides of the first and second eyelets. In one preferred embodiment, the insulating member includes a first insulating portion rotatably coupled to a second insulating portion by a third joint. The first insulating portion comprises a smooth insulating rod and the second insulating portion comprises an insulating rod having sheds.

The present invention spacer-twister device can be part of a system for spacing first, second and third conductors apart. The clamps of a first spacer-twister device grip the first and second conductors. The insulating member of the first spacer-twister device provides proper spacing between the first and second conductors. The rotatable joints allow twisting of the first and second conductors for preventing galloping of those conductors. The clamps of a second spacer-twister device grip the second and third conductors. The insulating member of the second spacer-twister device provides proper spacing between the second and third conductors. The rotatable joints allow twisting of the second and third conductors for preventing galloping of those conductors. The first and second spacer-twister devices forming the present invention system may be employed in a wishbone conductor configuration or in a vertical conductor configuration.

The present invention spacer-twister system is easily and quickly installed in a cost effective manner. In both the wishbone conductor configuration and the vertical conductor configuration, only two spacer-twister devices are required per span.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 12 is a side view of another preferred method of suspending the suspension clamp from an insulator on a tower.

FIG. 14 is a front view of the present invention spacer-twister device.

FIG. 15 is a side view of the spacer-twister device of FIG. 14.

DETAILED DESCRIPTION OF THE INVENTION

Figure 1:
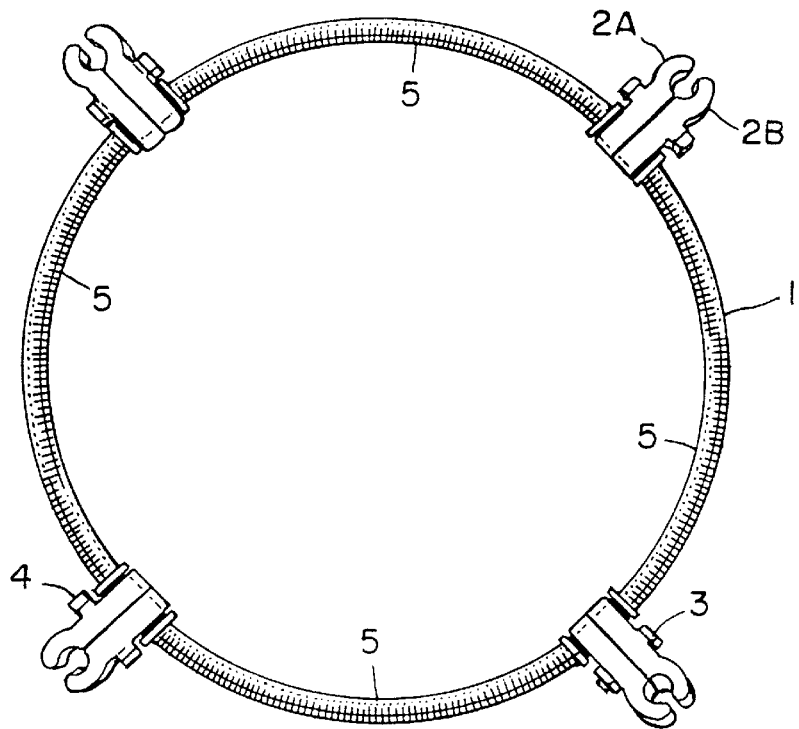
FIG. 1 is a view looking along the line of a four (quad) bundle line showing the present invention based on a two foot square bundle configuration.

Pertinent portions of the parent applications follow for convenience. Details of the present invention will then be more easily understood as described thereafter.

An apparatus for spacing two or more subconductors in a span of several subconductors is shown in FIGS. 1, 2, 3, and 4A–4C. Included therewith are means to dampen vibration of the subconductors. A structural component is formed in the shape of a closed hoop 1. Before fixing the ends of the hoop 1 by welding, clamps 2A and 2B are threaded along the hoop together with springs 5, rubber washers 6 and flat washers 7. Spacing of the subconductors is controlled by the position of the clamps 2A and 2B around the hoop.

A single bolt 3 is used to fix the clamps 2A and 2B to the subconductor by tightening to a locknut 4 which in turn is held in place by a retainer 8 which prevents the nut from turning. Rubber washers 6 are pressed against the sides of the clamps 2A and 2B by precompressed springs 5 bearing against flat washers 7.

If vibration is occurring in one or more of the subconductors due to wind or other causes, the bending of the subconductor against the clamps 2A and 2B induces rotation of the clamps 2A and 2B about the hoop 1. Such rotation is resisted by shearing stress in the rubber washers 6 or by dry friction between the flat washers 7 and the springs 5. This resistance is one form of damping that occurs.

Another form of damping is caused by the movement of the subconductor perpendicular to the hoop 1. This action causes the clamps 2A and 2B to move a small amount in the radial direction against the hoop 1. The resulting kinetic impact creates energy loss which causes damping.

Another form of damping is caused by the movement of the subconductor tangentially along the hoop 1. This action causes the clamp 2A and 2B to compress the spring 5 or allow the spring 5 to extend itself from its initial compression. In either case energy is stored and released during a cycle of vibration. The energy that is stored and released is accompanied by energy loss which causes damping.

A further form of damping is provided by movement of the spring 5 against the hoop 1 in a radial direction. This action creates kinetic impact between the spring 5 and the hoop 1 during a cycle of vibration. Such impact causes damping to occur.

The above described damping action will occur in any number of subconductors from two to four to six or more. The only difference between spacer-damper parameters is the number of subconductors and the diameter of the hoop. Individual design of the product may be achieved by varying the diameter of the hoop, the diameter of the round rod that forms the hoop, the size of the clamps that attach to the subconductor, the number of clamps, the spacing of the clamps, the composition of the material (common grade steel etc.), and the design of the clamp itself.

Figure 2:
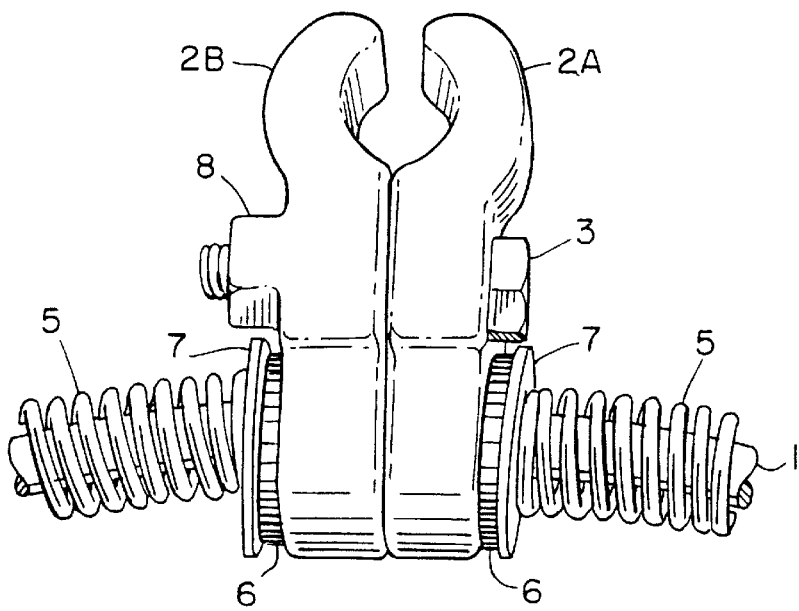
FIG. 2 is a close-up view of the aluminum clamps employed in FIG. 1 and illustrating the single bolt keeper, the nut retainer (on the left side), the rubber washer grommets between the clamps and the flat steel washers, and the compressed springs over the steel hoop.

An UHV embodiment of the parent applications is depicted in FIGS. 3 and 4A–4C and is used for UHV voltage levels above 620 kV. In this form the clamp 9 consists of a single piece of aluminum casting shaped in a way to gradually penetrate the electric field formed by the subconductors. A subconductor bears against the inside of the clamp 9 and is fixed in place by a keeper 10. The keeper 10 is shaped to allow its insertion after the subconductor is in place. A slot 15 is provided in the clamp 9 to allow the keeper 10 to slide under the subconductor until the keeper 10 is prevented from further sliding by the larger portion 16. This larger portion 16 is also recessed to receive a bolt 14 which bears against the keeper 10 forcing the subconductor to bear against the underside of the clamp 9. The bolt 14 is held in place by a captive locknut 13 which is further held by retainer 12. The clamp 9 is positioned along the hoop 1 in the same manner as the previous clamps 2A and 2B (FIGS. 1 and 2). The clamp 9 has a core 11 which allows free rotation of the clamp 9 about the hoop 1 during any type of subconductor vibration. All of the four forms of vibration damping previously identified will be active with the clamp 9.

Figure 5:
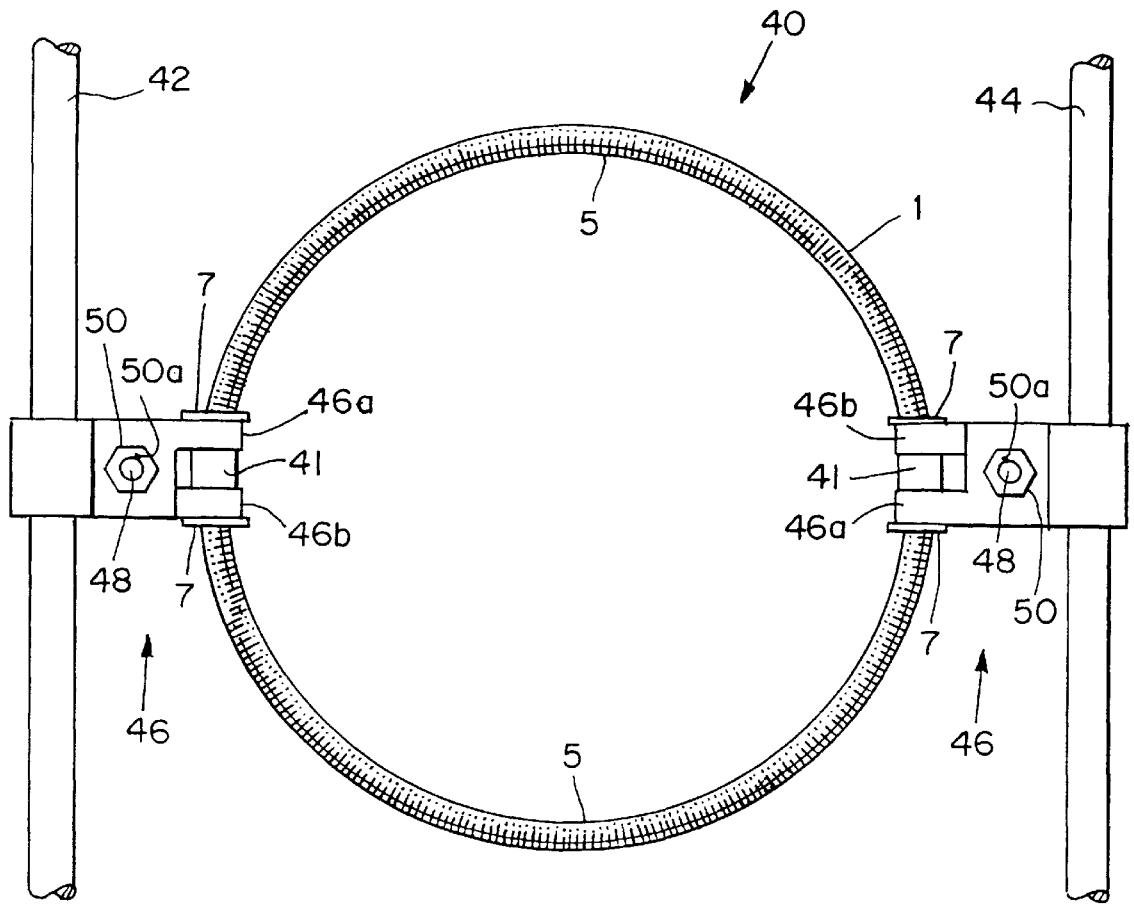
FIG. 5 is a plan view of another preferred spacer-damper device.

Applicant has discovered that when spacing two high voltage subconductors apart, a spacer-damper having portions which extend outside the plane between the two subconductors is subject to corona effects. Referring to FIG. 5, spacer-damper 40 is a preferred embodiment that is employed for spacing two subconductors 42 and 44 apart from each other in such high voltage situations (above 500 kV) in order to reduce corona effects. Spacer-damper 40 includes a rigid hoop 1 (like that of the spacer-dampers in the related applications, i.e. FIG. 1) preferably made of steel with two clamps 46 fitted about hoop 1 which are spaced apart from each other on opposite sides of the hoop 1 by springs 5. A steel washer 7 is sandwiched between each spring 5 and clamp 46. Although spacer-damper 40 does not typically have rubber washers, rubber washers can alternatively be employed between clamps 46 and washers 7 such as depicted in FIG. 2. Each clamp 46 consists of a clamp half 46a and 46b. The rear part of clamp halves 46a and 46b are not as wide as the front part and are separated from each other by a spacer 41. Spacer 41 is preferably a single polymeric member but alternatively can include multiple steel washers. Spacer-damper 40 differs from the spacer-dampers of the parent applications depicted in FIGS. 1 and 3 in that clamps 46 grip subconductors 42 and 44 to hold them substantially in the same plane as hoop 1. This greatly reduces corona effects in high voltage situations in comparison to the spacer-dampers of FIGS. 1 and 3 which position the hoop in a plane that is perpendicular to the subconductors. Spacer-dampers which extend outside or beyond the plane between the subconductors increase corona effects because of high voltage gradient.

Spacer-damper 40 also increases the overturning angle of the bundled subconductors 42 and 44 since the clamps 46 are capable of both sliding along and rotating about hoop 1. As a result, subconductors 42 and 44 are able to twist during heavy winds which varies the air flow pattern over the subconductors and reduces galloping. In addition, by twisting the subconductors with spacer-damper 40 in opposition to rotation of the bundled subconductors caused by galloping, energy is removed from the galloping motion resulting in a diminished gallop amplitude.

Spacer-damper 40 preferably spaces subconductors 42 and 44 about 22 inches apart from each other in comparison to prior art spacer-dampers which typically space subconductors only 18 inches apart. Increasing the spacing of subconductors to about 22 inches increases the moment of inertia or stiffness of the bundled subconductors about 50% which also improves the resistance to galloping of the subconductors in high winds. Furthermore, the 22 inch spacing reduces exposure to sub-span oscillation, bundle torque upset, loading of spacer-damper units by short circuit currents and inductive reactance. This improves system stability, reduces voltage drop and increases line capacity by at least 5%.

Although spacer-damper 40 preferably spaces the subconductors 22 inches apart, any spacing within the range from about 22 to 24 inches is suitable. Alternatively, spacer-damper 40 can also be sized to space subconductors less than 22 inches apart or more than 24 inches apart. Also, the spacer-dampers depicted in FIGS. 1 and 3 can also be sized to space multiple subconductors 22–24 inches apart to provide improved properties.

When resisting aeolean vibration, spacer-damper 40 is capable of dissipating up to about 5 watts of power when rubber washers are inserted between clamps 46 and washers 7 and about 3.5 watts without rubber washers. The addition of rubber washers is not essential because the rubber washers increase power dissipation only in the mid-range and high-range vibration frequencies (about 45 Hz and 70 Hz).

Figure 6:
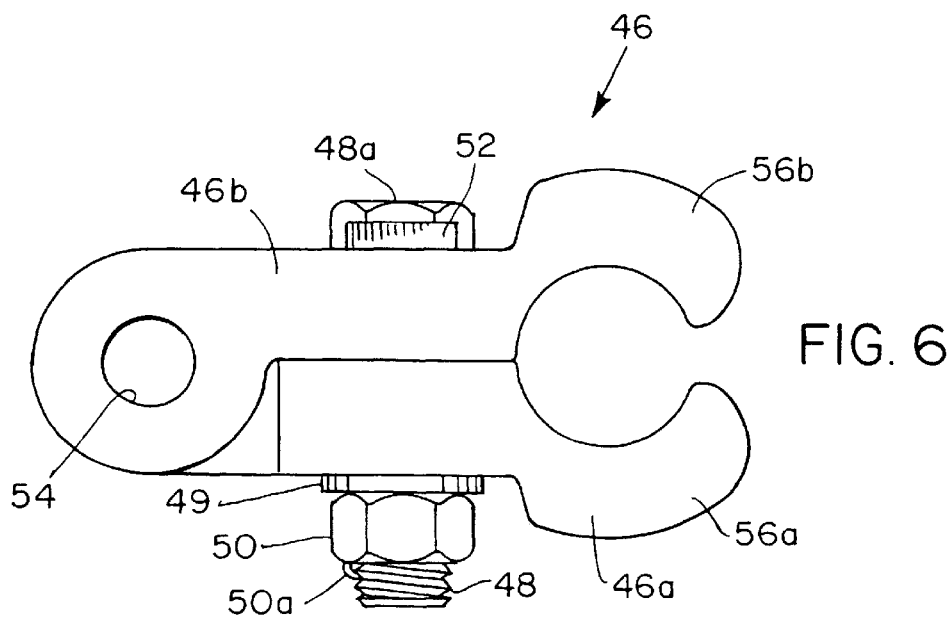
FIG. 6 is an enlarged side view of one of the clamps employed in the spacer damper of FIG. 5.

Referring to FIG. 6, clamp halves 46a and 46b include gripping jaws 56a and 56b, respectively, for gripping subconductors 42 and 44. Gripping jaws 56a and 56b have curved interior surfaces for gripping subconductors 42 and 44. The clamp halves 46a and 46b are mounted about hoop 1 through holes 54 which allow clamp halves 46a and 46b to pivot about hoop 1 as well slide along hoop 1. Gripping jaws 56a and 56b grip subconductors 42 and 44 when clamp halves 46a and 46b are tightened by bolts 48, lock washers 49 and lock nuts 50. Each lock nut 50 includes a lock wire 50a for engaging the threads of a bolt 48 to prevent loosening. Each clamp half 46b includes two stops 52 located on opposite sides of the head 48a of bolt 48 which prevents the head 48a from rotating when lock nut 50 is tightened. Clamps 46 are preferably made of aluminum but alternatively, can be made of other suitable metals such as steel. Additionally, clamps 46 can be replaced with other equivalent clamps that are slidable and rotatable about hoop 1. Furthermore, one stop 52 can be employed or stops 52 can be omitted.

Figure 3:
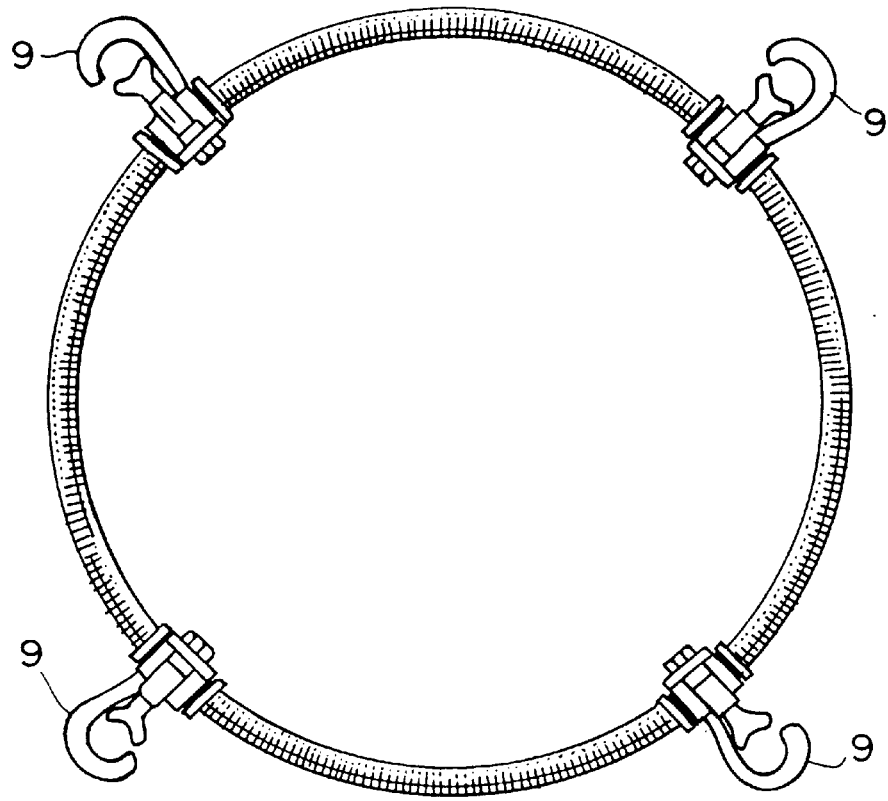
FIG. 3 illustrates the type of clamp that is used for UHV voltage higher than 620 kV.
Figure 4A:
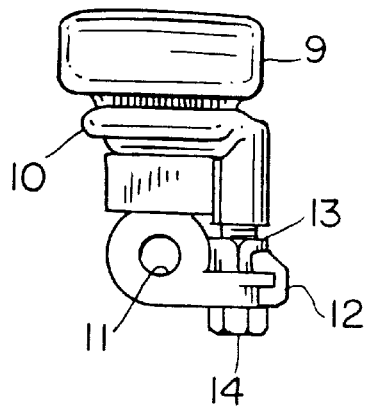
FIGS. 4A–4C illustrate the clamp components that are used for UHV voltage higher than 620 kV.
Figure 4B:
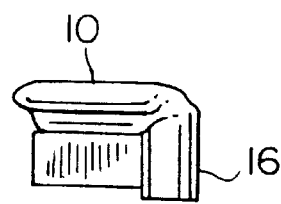
Figure 4C:
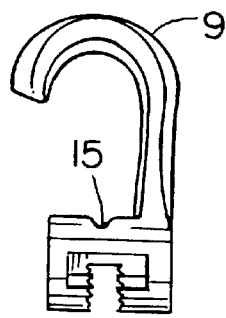
Figure 8:
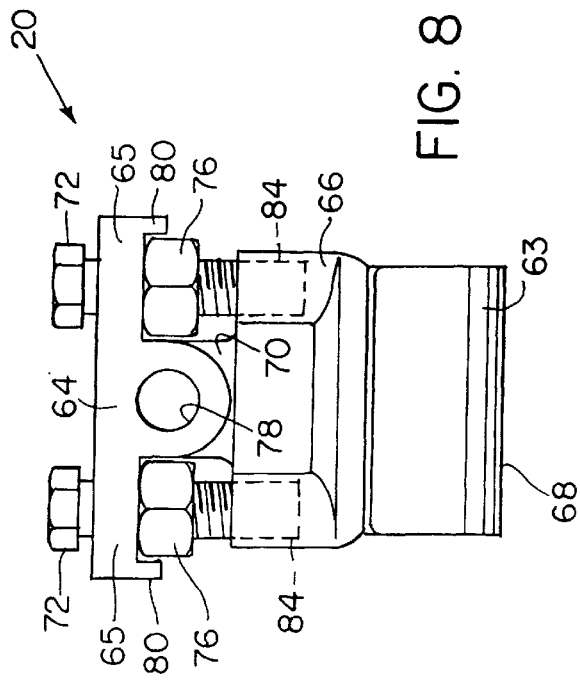
FIG. 8 is a side view of the clamp of FIG. 7.
Figure 7:
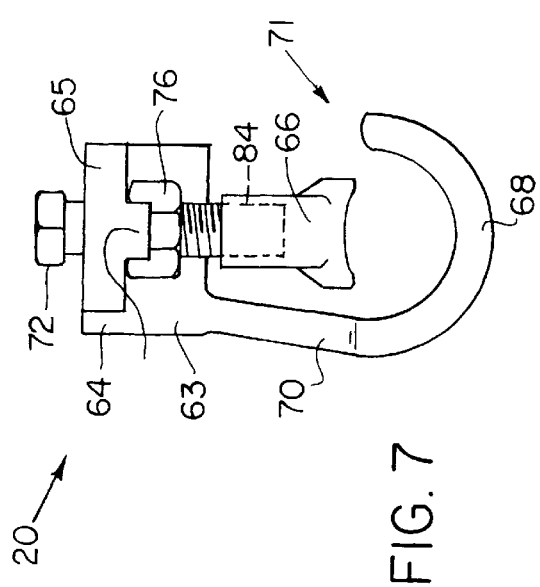
FIG. 7 is an end view of another preferred clamp.

Referring to FIGS. 7 and 8, clamp 20 is a two bolt clamp which can be substituted for clamps 2A, 2B and 9 in FIGS. 1 and 3. Clamp 20 differs from clamp 9 in that clamp 20 includes two sets of bolts 72, retainers 80 and lock nuts 76. Clamp 20 includes a clamp body 63 having a mounting portion 64. Mounting portion 64 has a mounting hole 78 for mounting clamp 20 to hoop 1 (FIG. 1). Two flanges 65 extend from opposite sides of mounting portion 64. A J-shaped clamp arm 70 extends from mounting portion 64 to provide a cradle 68 for receiving a subconductor. The interior surface of cradle 68 is preferably curved but can alternatively be of other suitable shapes such as a V-shape. The J-shaped clamp arm 70 provides clamp body 63 with an entry way 71 to the interior surface of cradle 68 on the side of clamp body 63 opposite to clamp arm 70. Entry way 71 allows subconductors to be easily slipped into cradle 68 during installation.

Keeper 66 traps the subconductor received within cradle 68. The bottom surface of keeper 66 is preferably curved to conform to the round cross section of the subconductor. Alternatively, the bottom surface of keeper 66 can be of other suitable shapes such as a V-shape. Keeper 66 is clamped against the subconductors by bolts 72 which pass through flanges 65 of the mounting portion 64 of clamp body 63. Keeper 66 includes two bores 84. The ends of bolts 72 extend into bores 84 to prevent lateral movement of keeper 66. Stops 80 are optionally included on flanges 65 to prevent rotation of nuts 76 during installation. The two bolt design of clamp 20 allows subconductors to be more securely and uniformly clamped with clamp 20 than with clamps 2A, 2B and 9.

Figure 9:
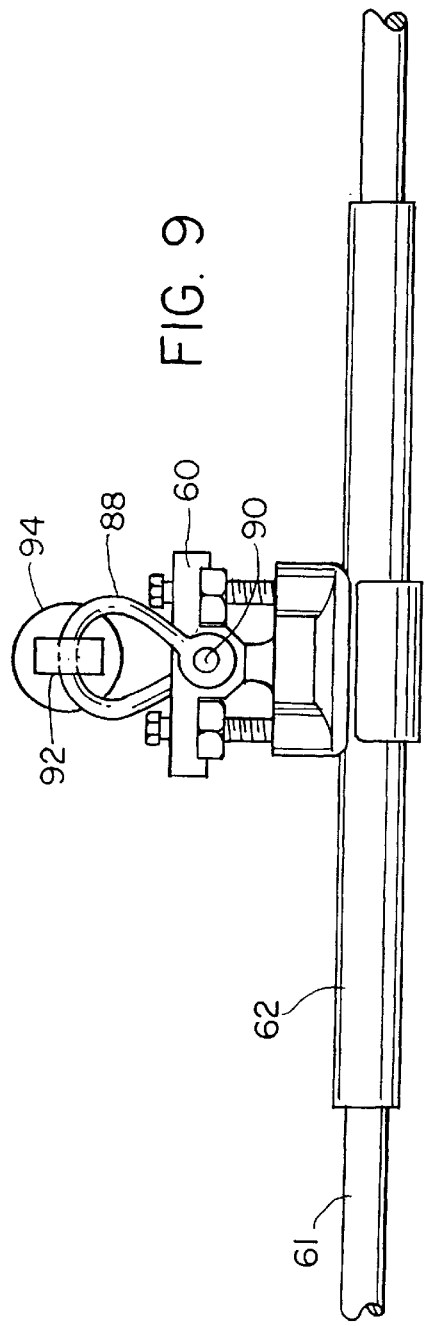
FIG. 9 is a side view of a suspension clamp that is suspended from an insulator on a tower for supporting a subconductor.

Referring to FIG. 9, suspension clamp 60 is similar to clamp 20 depicted in FIGS. 7 and 8 but differs in that suspension clamp 60 is securable to an insulator 94 of a tower for supporting a subconductor 61. In order to secure suspension clamp 60 to insulator 94, a shackle 88 is first hung from eyelet 92 of insulator 94. A shear pin 90 is then employed to couple suspension clamp 60 to shackle 88. This arrangement allows movement of the suspension clamp 60 and subconductor 61 relative to insulator 94, thereby reducing stresses exerted on insulator 94 by subconductor 61 in high winds. An armor rod 62 is preferably fitted over subconductor 61 in the area of suspension clamp 60 to protect subconductor 61.

Figure 11:
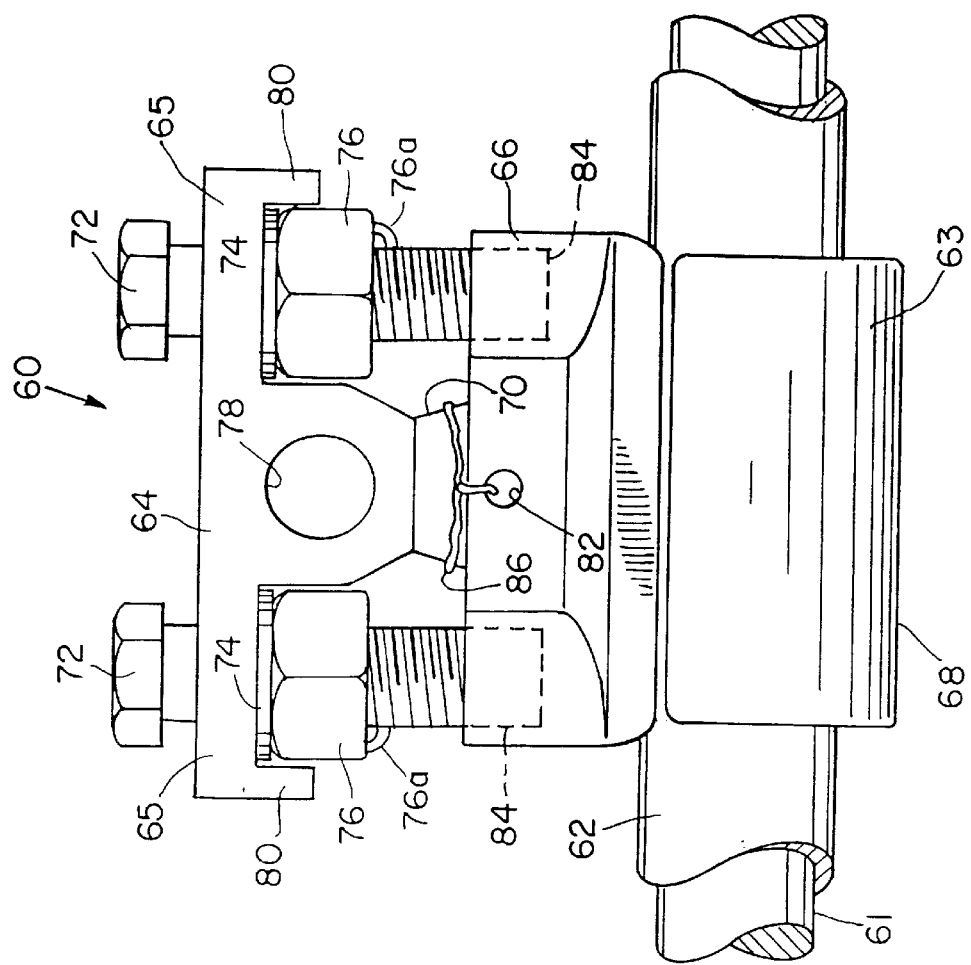
FIG. 11 is an enlarged side view of the suspension clamp depicted in FIG. 9.
Figure 10:
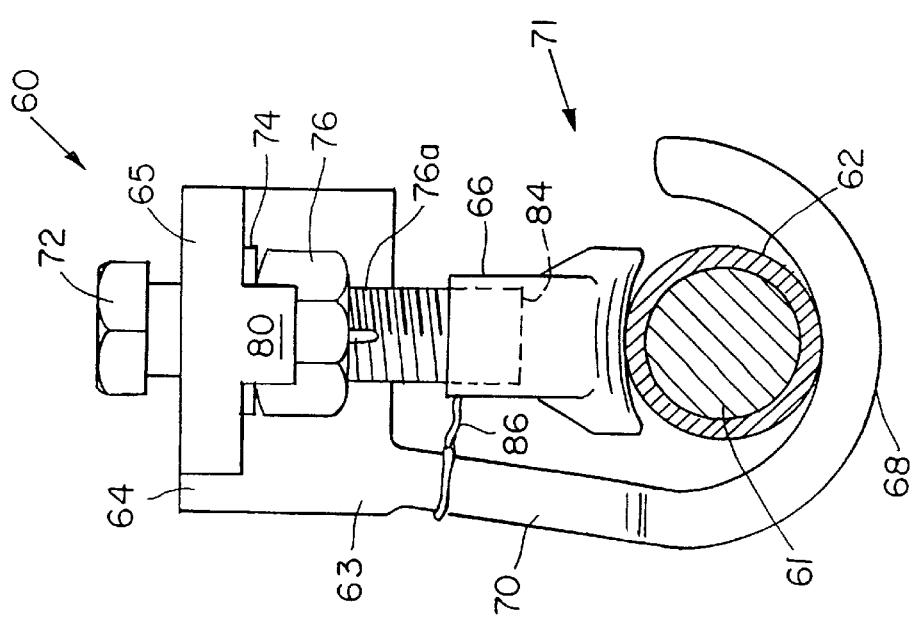
FIG. 10 is an enlarged end view of the suspension clamp depicted in FIG. 9.

Referring to FIGS. 10 and 11, armor rod 62 and subconductor 61 are clamped within the cradle 68 of suspension clamp 60. Mounting hole 78 which passes through mounting portion 64, allows suspension clamp 60 to be mounted to shackle 88. Entry way 71 allows subconductor 61 to be easily slipped into cradle 68 during installation.

Keeper 66 traps the armor rod 62 and subconductor 61 within cradle 68. Lock washer 74 and lock nut 76 lock bolts 72 in position. Lock nuts 76 include lock wires 76a for locking nuts 76 in place. A hole 82 is provided within keeper 66 so that a cord 86 can be tied around suspension arm 70 and keeper 66 to prevent keeper 66 from being lost during installation. Since keeper 66 is tightened onto armor rod 62 by only two bolts, suspension clamp 60 is quickly and easily installed making it suitable for installation by helicopter.

FIG. 12 depicts another preferred method of hanging suspension clamp 60 from insulator 94. A Y-clevis 96 is hung from eyelet 92. Two 90° twisted brackets 98 are coupled to suspension clamp 60 by pin 90 and are coupled to Y-clevis 96 by pin 97. This method is typically employed when shackles 88 of the correct size are not available. Additionally, other suitable methods can be employed for coupling suspension clamp 60 to eyelet 92 which allow movement of suspension clamp 60 relative to insulator 94.

Figure 13:
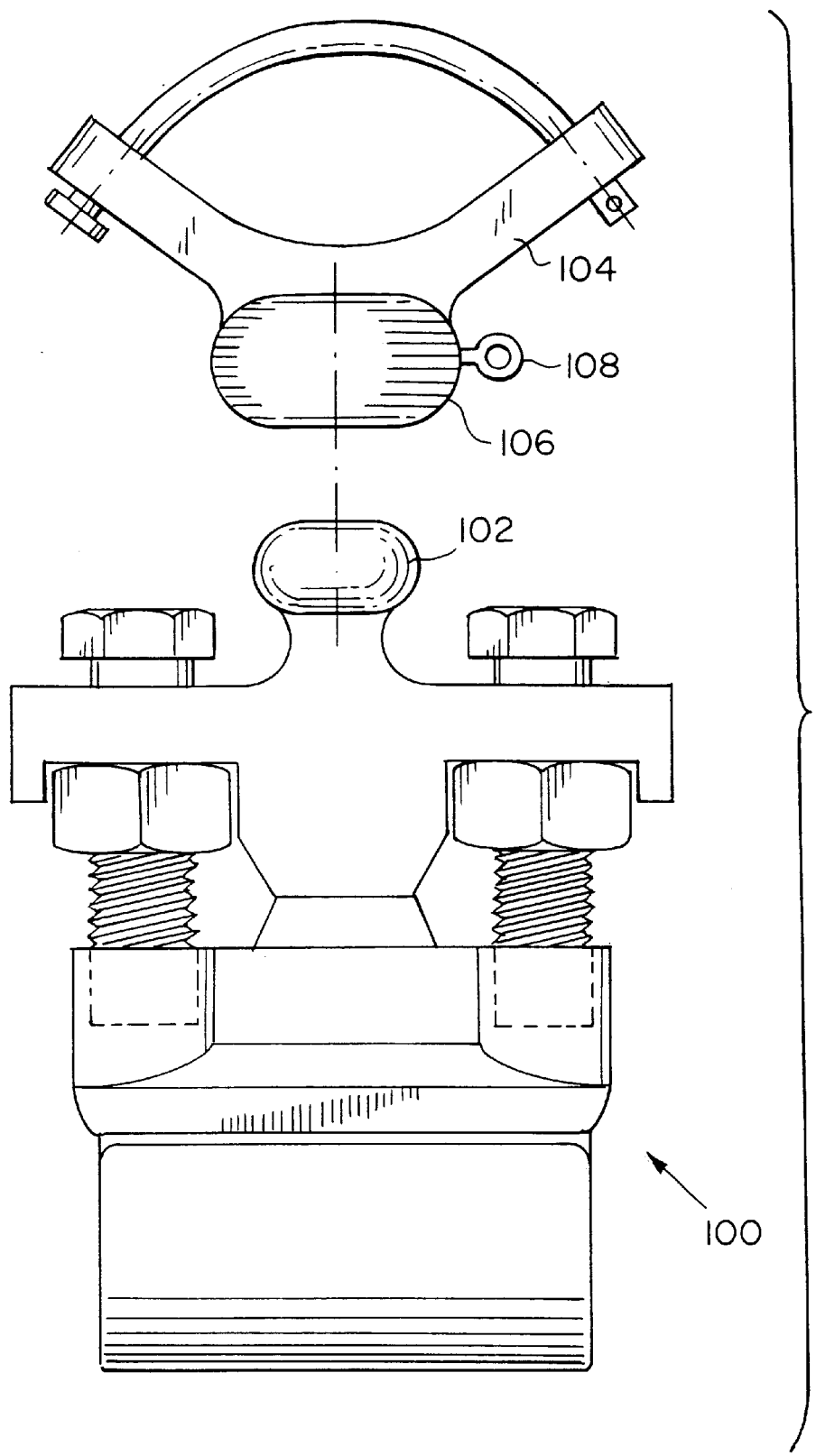
FIG. 13 is a side view of still another preferred method of suspending a suspension clamp.

FIG. 13 depicts still another preferred method of hanging a suspension clamp from an insulator. A Y-clevis 104 is hung from the eyelet of the insulator as in FIG. 12. Y-clevis 104 differs from Y-clevis 96 of FIG. 12 in that Y-clevis 104 includes a ball socket 106. Suspension clamp 100 couples to Y-clevis 104 and is similar to suspension clamp 60 but differs in that suspension clamp 100 includes a ball 102 that mates with socket 106. A locking mechanism 108 locks ball 102 within socket 106 while allowing articulation of the ball 102 within socket 106.

Referring to FIGS. 14 and 15, the present invention includes a spacer-twister device 110 for spacing conductors apart while allowing twisting of the conductors for preventing galloping when ice forms on the conductors. Spacer-twister device 110 includes an insulating member formed from an insulating rod 112 which is rotatably coupled to two clamps 46. Insulating rod 112 is preferably formed from fiber glass but alternatively can be made of other suitable insulating materials. Clamps 46 are similar to the clamps depicted in FIG. 6. Insulating rod 112 includes two end pieces 114, each having an eyelet 114a. Each clamp 46 is secured to an eyelet 114a of an end piece 114 by a bolt 116 and nut 118. A washer 120 is preferably positioned on each side of the eyelet 114a for reducing wear. This arrangement forms a rotatable joint 130 between the clamps 46 and the end pieces 114. Rotatable joints 130 allow clamps 46 to rotate about +/− 120° along parallel axes. When ice forms on the conductors and the wind begins to lift the conductors, this ability of the joints 130 to rotate forces the ice laden conductors to twist along their axes moving the ice to positions where the ice does not behave as an air foil thus dumping off the lift forces that can cause the conductor lines to gallop.

Figure 16:
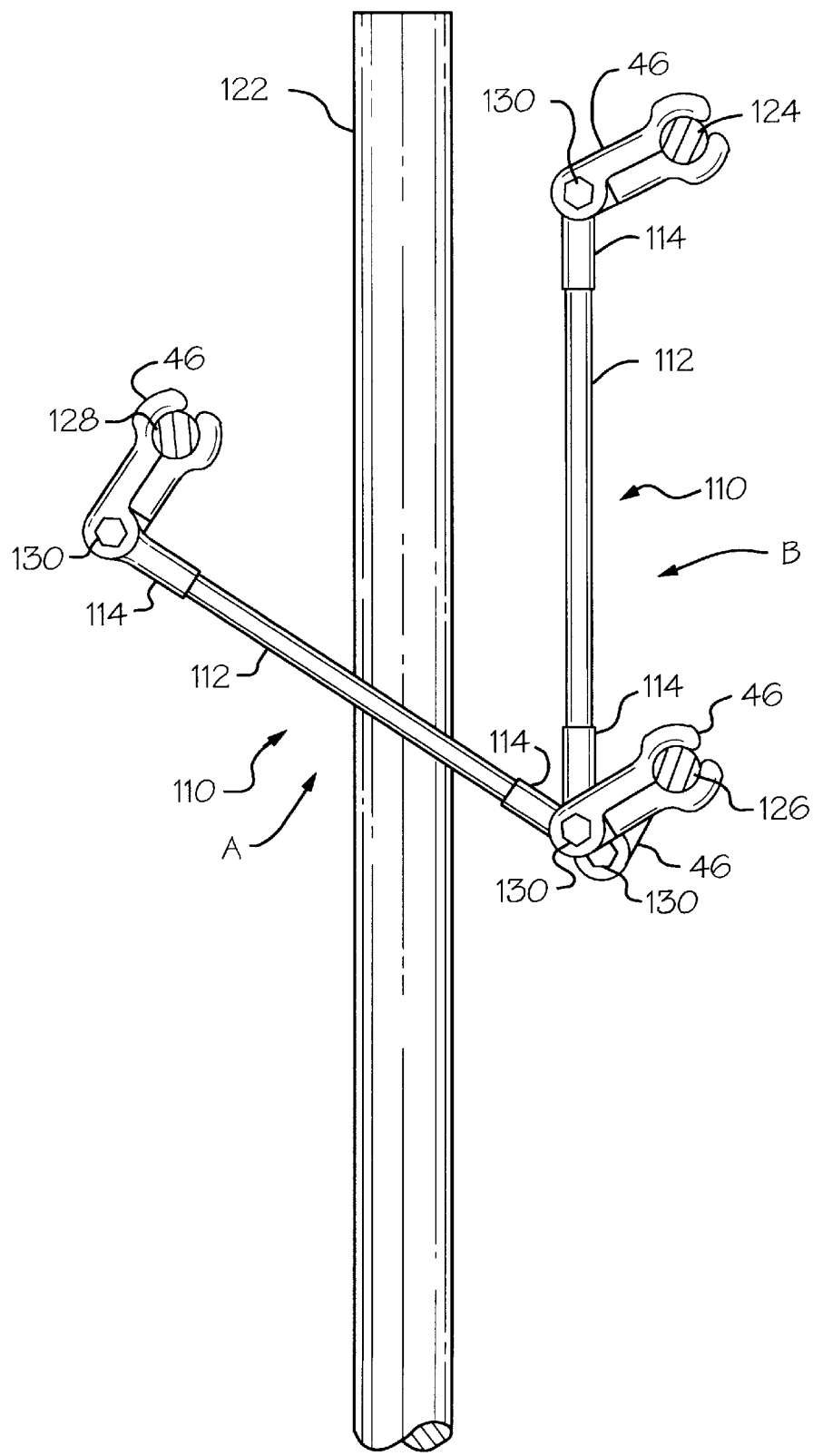
FIG. 16 depicts two spacer-twister devices coupled to conductors in a wishbone configuration.

One preferred method of employing spacer-twister device 110 is depicted in FIG. 16. Conductors 124, 126 and 128 are arranged in a wishbone/single circuit structure where two conductors 124 and 126 are on one side of pole 122 and one conductor 128 is on the other side of the pole 122. In a span supported between two poles 122, two spacer-twister 110 devices (labeled A and B) are attached adjacent to each other at one point in the span. This point is located at about the one-third point of the span, plus or minus about 5 feet. The lower clamps 46 of spacer-twister devices A and B are secured to the bottom conductor 126 adjacent to each other (about 6 to 8 inches apart). The upper clamp 46 of spacer-twister device A is secured to conductor 128 and the upper clamp 46 of spacer-twister device B is secured to conductor 124. The clamps 46 of each spacer-twister device A and B are rotated relative to the insulating rod 112 (as shown) so that the clamps 46 and insulating rods 112 are not in line with each other. This positions each insulating rod 112 on the same side of the respective conductor pairs 126/128 and 126/124. The use of this configuration allows the bottom conductor 126 to twist if a galloping incident occurs.

Figure 17:
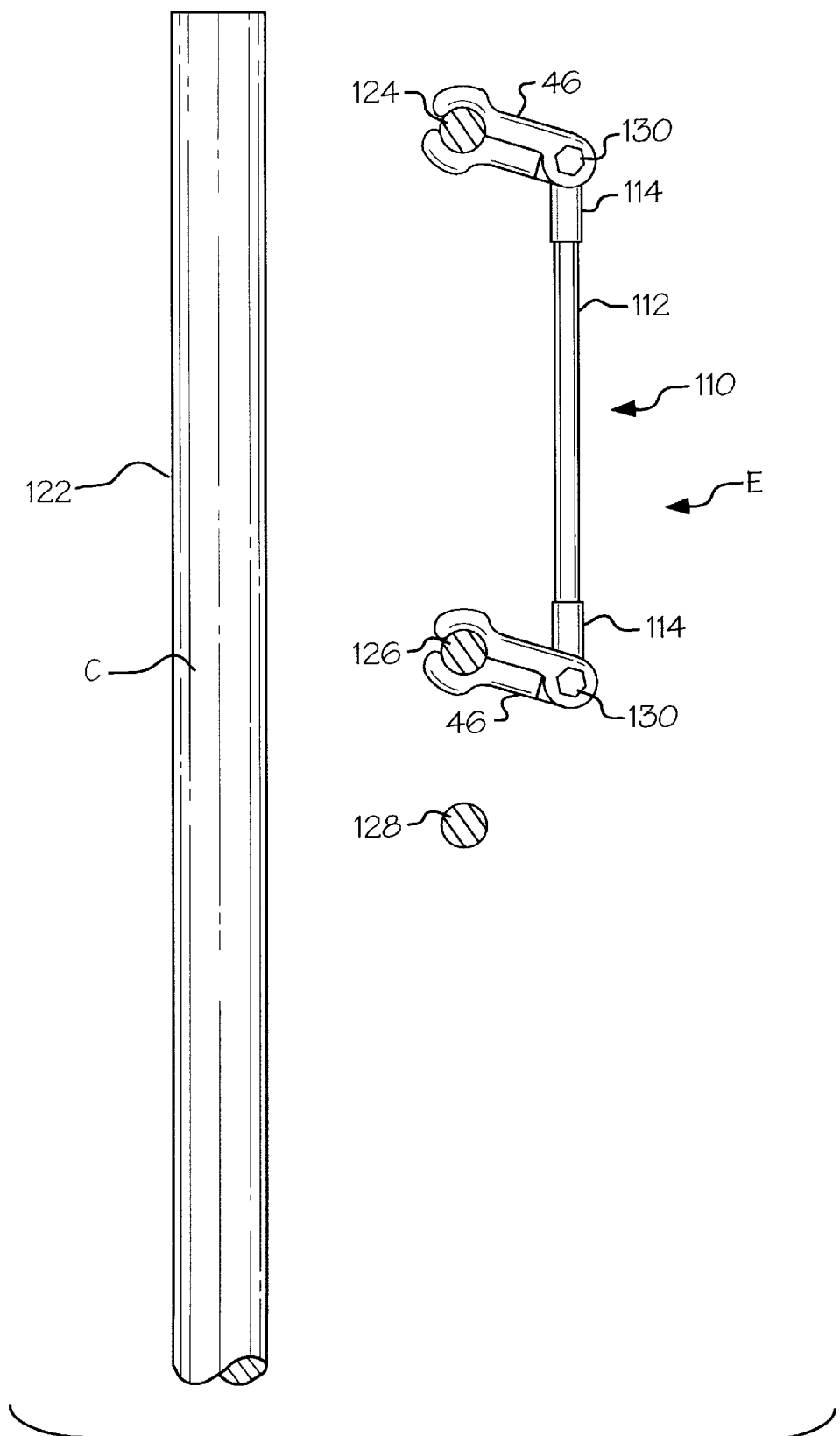
FIGS. 17 and 18 depict two spacer-twister devices coupled to conductors in a vertical configuration.
Figure 18:
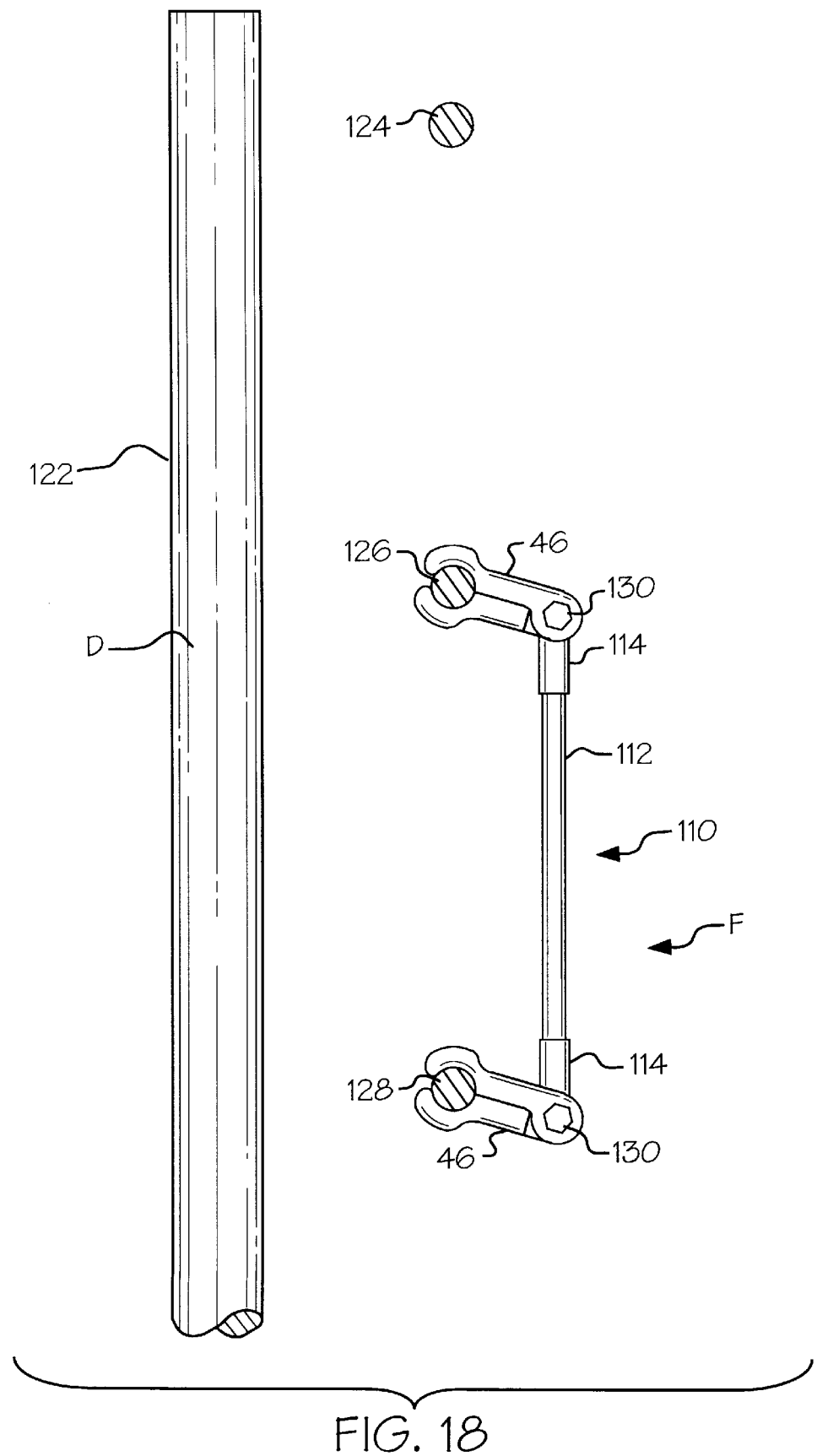

Another preferred method of employing spacer-twister device 110 is depicted in FIGS. 17 and 18. Conductors 124, 126 and 128 are arranged in a double circuit/vertical construction in a span supported between two poles 122 (labeled C and D). A first spacer-twister device 110 (labeled E) is attached to conductors 124 and 126 at about the ⅓ point in the span between poles C and D plus or minus about 5 feet. The second spacer-twister device 110 (labeled F) is attached to conductors 126 and 128 at about the ⅔ point in the span plus or minus about 5 feet. In other words, each spacer-twister device 110 is positioned at about the ⅓ point away from a pole 122. Clamps 46 are rotated relative to insulating rods 112 in the same manner as shown in FIG. 16 to allow the conductors to twist. The initial orientation of the clamps 46 on the conductors 124, 126 and 128 is arbitrary. Clamps 46 of the same spacer-twister device E or F which are initially on the same side of the attached conductors 124/126 or 126/128 could end up on opposite sides after a galloping incident. The clamps 46 can then end up again on the same side after another galloping incident. A small amount of twist (as little as 10°) can reduce galloping amplitudes to harmless levels.

Figure 19:
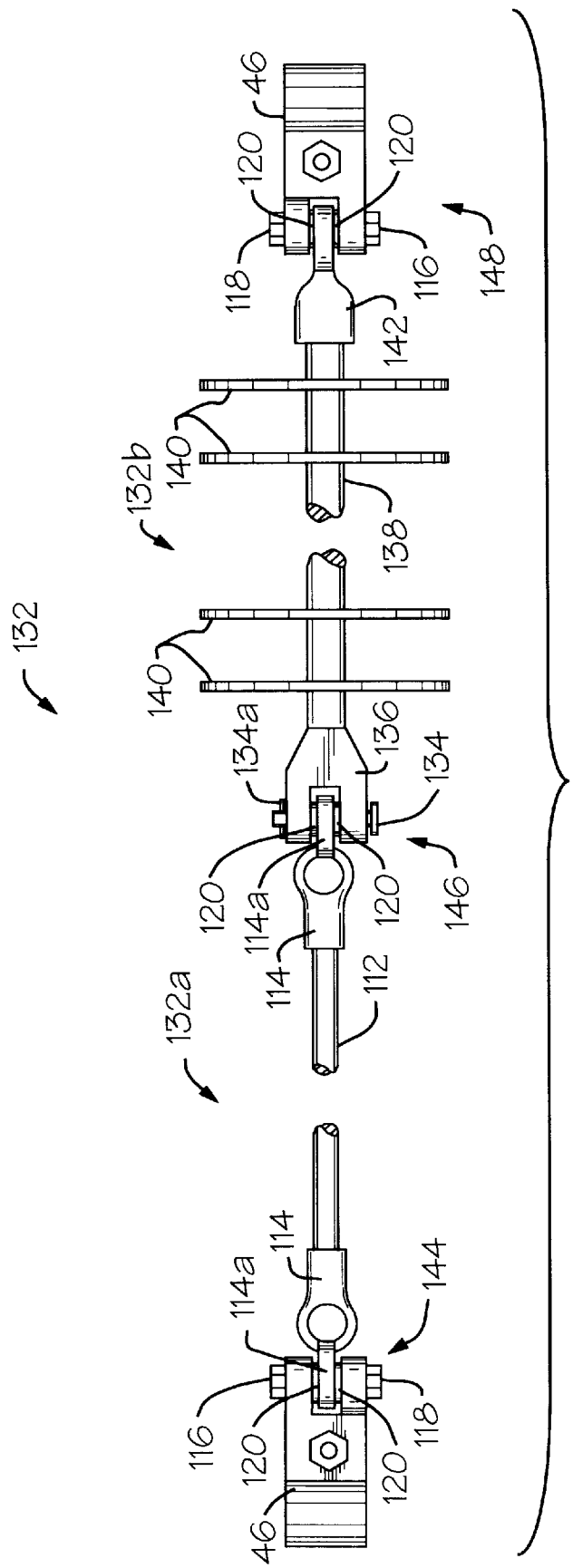
FIG. 19 is a front view of another preferred spacer-twister device.

Referring to FIG. 19, spacer-twister device 132 is another preferred spacer-twister device of the present invention. Spacer-twister device 132 differs from spacer-twister device 110 in that the insulating member of spacer-twister device 132 has a first insulating portion 132a and a second insulating portion 132b which are rotatably coupled together by a joint 146. The first insulating portion 132a includes an insulating rod 112 and the second insulating portion includes an insulating rod 138 having sheds 140 which is rotatably coupled by a rotating joint 146 to eyelet 114a of insulating rod 112. Second insulating portion 132b includes a clevis fitting 136 at one end which is secured to the eyelet 114a of end piece 114 by a pin 134 and cotter pin 134a. A washer 120 is positioned on each side of eyelet 114a. Second insulating portion 132b has an eyelet fitting 142 at the end opposite to clevis fitting 136. Clamp 46 is rotatably coupled to eyelet fitting 142 by joint 148. The articulating insulating member (132a, 132b collectively) of spacer-twister device 132 allows space-twister device 132 to be made in longer lengths than possible with spacer-twister device 110 of FIG. 14. Spacer-twister device 132 can be used to space apart conductors in the same configurations as depicted in FIGS. 16–18 and can be employed in situations where the voltage between conductors is too large for spacer-twister device 110.

Figure 20:
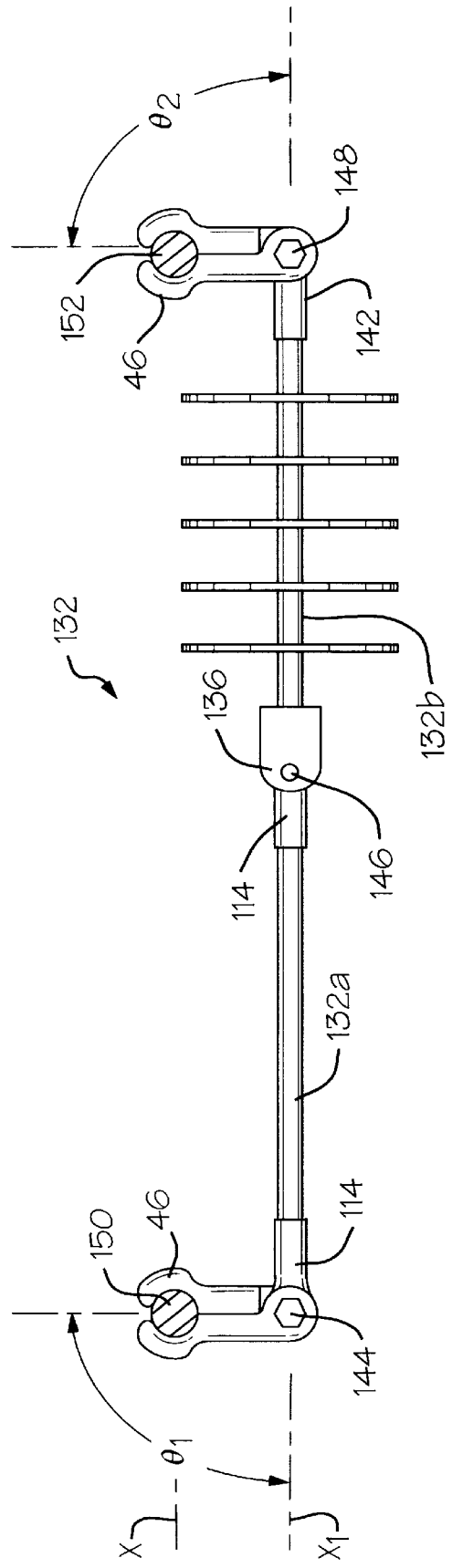
FIG. 20 is a side view of the spacer-twister device of FIG. 19 coupled to conductors with FIG. 21 depicting articulation of the spacer-twister device.
Figure 21:
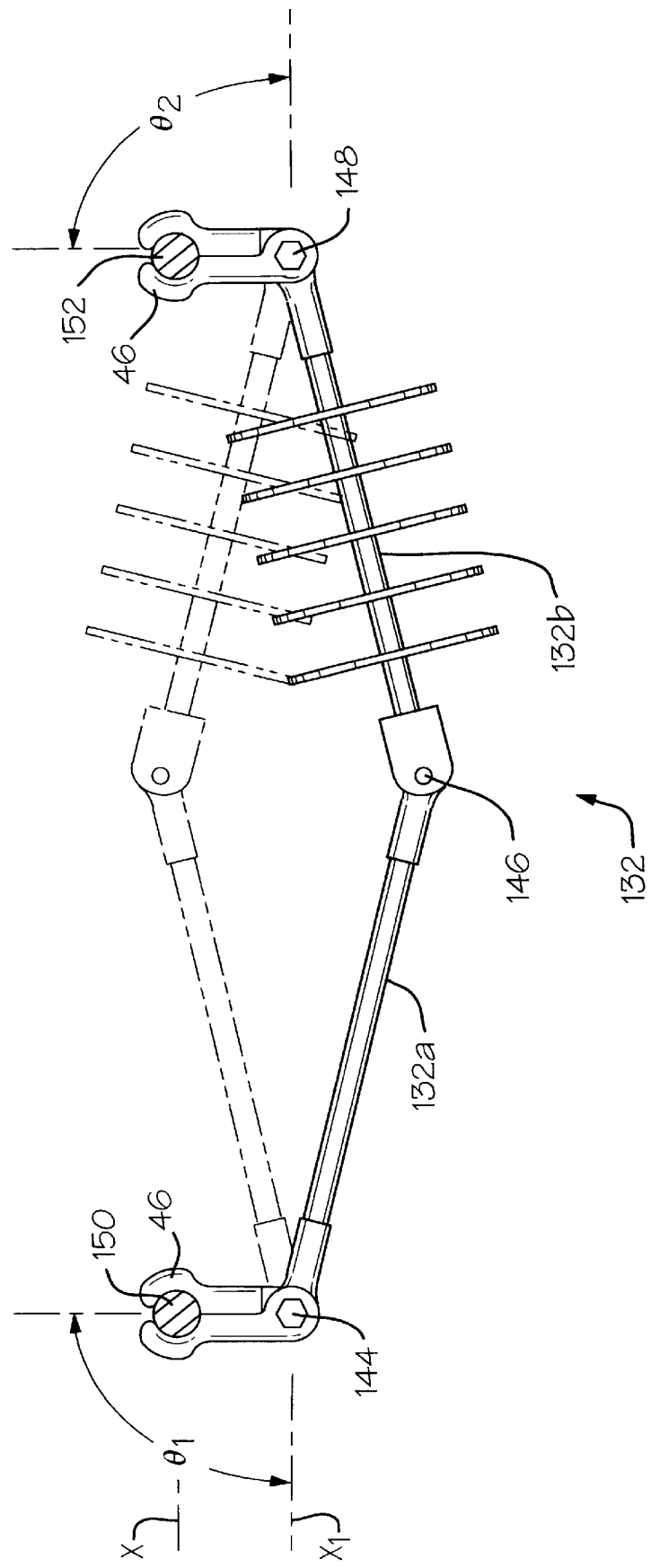

Referring to FIGS. 20 and 21, in use, spacer-twister device 132 is secured to conductors 150 and 152 with clamps 46 positioned at an angle relative to the longitudinal axis X between conductors 150 and 152 as well as the longitudinal axis $X_1$ of insulating portions 132a/132b. The longitudinal axis $X_1$ is offset from the longitudinal axis X. Although clamps 46 are shown to be positioned on the same side of conductors 150/152, the position of clamps 46 can change after a galloping incident to be on opposite sides of conductors 150/152. When conductors 150/152 move apart during a galloping incident, the angles of clamps 46 relative to axis $X_1$, $\theta_1$ and $\theta_2$, become smaller as clamps 46 rotate. Angles $\theta_1$ and $\theta_2$ are not necessarily equal to each other. FIG. 21 depicts the articulation of spacer-twister device 132 about joints 144, 146 and 148 when conductors 150/152 move toward each other during a galloping incident. Insulating portions 132a and 132b can swing to either side of axis X. In addition, angles $\theta_1$ and $\theta_2$ become larger as conductors 150/152 move toward each other and clamps 46 rotate.

Figure 22:
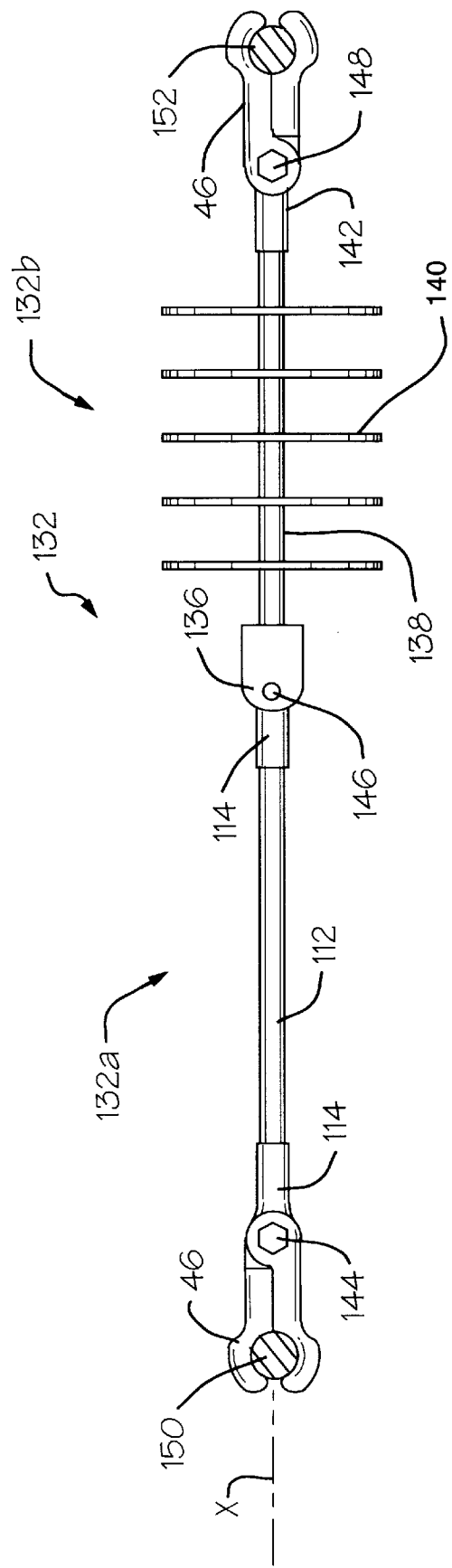
FIG. 22 is a side view of the spacer-twister device of FIG. 19 coupled to conductors in another preferred configuration with FIG. 23 depicting articulation of the spacer-twister device.
Figure 23:
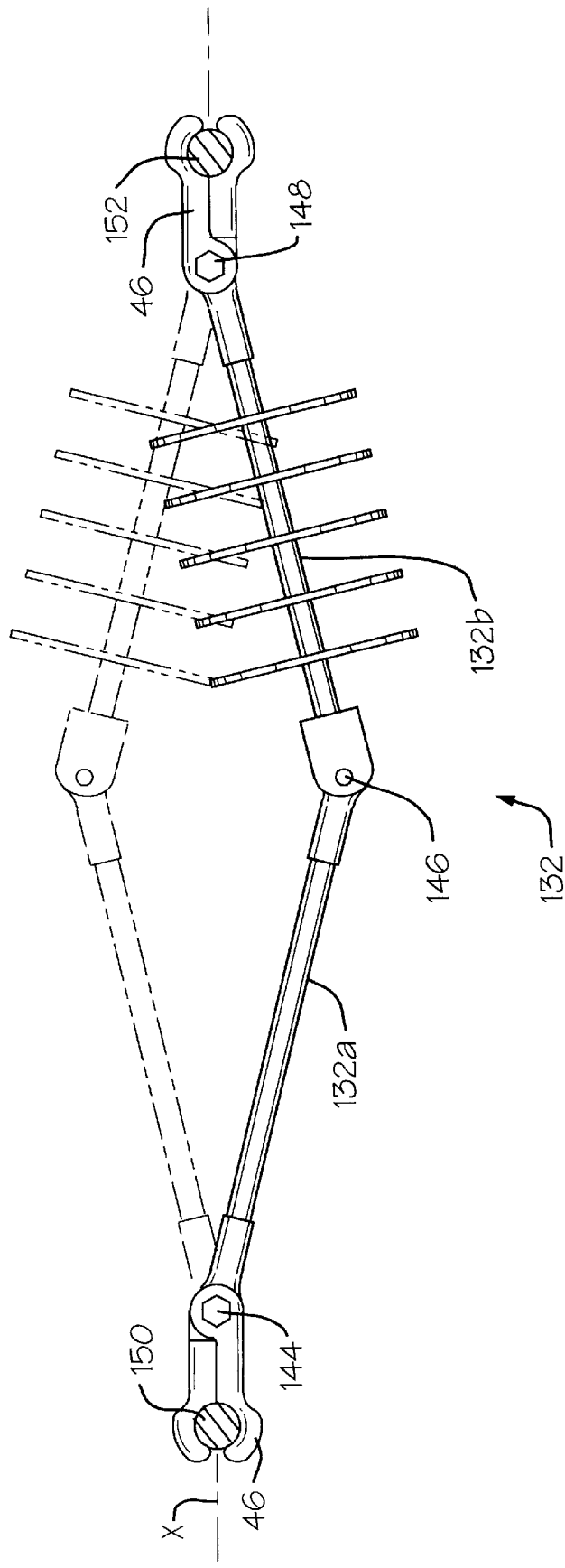

FIGS. 22 and 23 depict another preferred method of employing spacer-twister device 132. Spacer-twister device 132 can also be secured to conductors 150 and 152 in a manner where clamps 46 are positioned along the longitudinal axis X between conductors 150 and 152 in line with insulating portions 132a/132b. FIG. 23 depicts the articulation of joints 144, 146 and 148 for this arrangement. Clamps 46 can rotate relative to longitudinal axis X.

Equivalents

While this invention has been particularly shown and described with references to preferred embodiment thereof, it will be understood by those skilled in the art that various changes and form and details may be made therein without departing from the spirit and scope of the invention as defined by the appended claims.

What is claimed is:

1. A spacer-twister device for securing to first and second conductors comprising:

an elongate insulating member having first and second ends;

a first clamp rotatably coupled to the first end of the insulating member by a first joint for gripping the first conductor;

a second clamp rotatably coupled to the second end of the insulating member by a second joint for gripping the second conductor, the insulating member having a first insulating portion rotatably coupled to a second insulating portion by a third joint, the insulating member providing proper spacing between the first and second conductors, and the first and second joints allowing twisting of the first and second conductors for preventing galloping when ice forms on the conductors.

2. The spacer-twister of claim 1 in which the first insulating portion comprises a smooth insulating rod and the second insulating portion comprises an insulating rod having sheds.

3. The spacer-twister of claim 1 in which the insulating member includes a first eyelet at the first end and a second eyelet at the second end, the first and second clamps each having a pair of mounting flanges, the first and second eyelets each being rotatably coupled between the mounting flanges of respective first and second clamps by a bolt, thereby forming the first and second joints.

4. The spacer-twister of claim 3 in which the first and second joints further comprise washers positioned on opposite sides of the first and second eyelets.

5. A spacer-twister device for securing to first and second conductors comprising:

an elongate insulating member having first and second ends;

a first clamp rotatably coupled to the first end of the insulating member by a first joint for gripping the first conductor;

a second clamp rotatably coupled to the second end of the insulating member by a second joint for gripping the second conductor, the insulating member having a first insulating portion rotatably coupled to a second insulating portion by a third joint, the first insulating portion insulating portion comprising an insulating rod having sheds, the insulating member providing proper spacing between the first and second conductors, and the first and second joints allowing twisting of the first and second conductors for preventing galloping when ice forms on the conductors.

6. The spacer-twister of claim 5 in which the insulating member includes a first eyelet at the first end and a second eyelet at the second end, the first and second clamps each having a pair of mounting flanges, the first and second eyelets each being rotatably coupled between the mounting flanges of respective first and second clamps by a bolt, thereby forming the first and second joints.

7. The spacer-twister of claim 6 in which the first and second joints further comprise washers positioned on opposite sides of the first and second eyelets.

8. A system for spacing first, second and third conductors apart comprising:

a first spacer-twister device for gripping the first and second conductors with respective first and second clamps, the first spacer-twister device including a first elongate insulating member rotatably coupled to the first and second clamps by rotatable joints, the first insulating member providing proper spacing between the first and second conductors, and the rotatable joints allowing twisting of the first and second conductors for preventing galloping thereof; and a second spacer-twister device for gripping the second and third conductors with respective third and fourth clamps, the second spacer-twister device including a second elongate insulating member rotatably coupled to the third and fourth clamps by rotatable joints, the second insulating member providing proper spacing between the second and third conductors, and the rotatable joints allowing twisting of the second and third conductors for preventing galloping thereof, the first and second elongate insulting members each comprising a first insulating portion rotatably coupled to a second insulating portion by an intermediate joint.

9. The system of claim 8 in which the first insulating portion comprises a smooth insulating rod and the second insulating portion comprises an insulating rod having sheds.

10. A method of spacing first and second conductors apart comprising the steps of:

gripping the first conductor with a first clamp;

gripping the second conductor with a second clamp;

providing an elongate insulating member, the insulating member having first and second ends;

rotatably coupling the first clamp to the first end of the insulating member with a first joint;

rotatably coupling the second clamp to the second end of the insulating member with a second joint, the insulating member providing proper spacing between the first and second conductors, and rotation of the first and second joints allowing twisting of the first and second conductors for preventing galloping thereof; and providing the insulating member with a first insulating portion and a second insulating portion, the first insulating portion being rotatably coupled to the second insulating portion by a third joint.

11. The method of claim 10 further comprising the steps of:

forming the first insulating portion from a smooth insulating rod; and forming the second insulating portion from an insulating rod having sheds.

12. A method of spacing first, second and third conductors apart comprising the steps of:

gripping the first and second conductors with first and second clamps of a first spacer-twister device, the first spacer-twister device including a first elongate insulating member rotatably coupled to the first and second clamps by rotatable joints, the first insulating member providing proper spacing between the first and second conductors, and rotation of the joints allowing twisting of the first and second conductors for preventing galloping thereof;

gripping the second and third conductors with third and fourth clamps of a second spacer-twister device, the second spacer-twister device including a second elongate insulating member rotatably coupled to the third and fourth clamps by rotatable joints, the second insulating member providing proper spacing between the second and third conductors, and rotation of the joints allowing twisting of the second and third conductors for preventing galloping thereof; and providing the first and second elongate insulating members each with a first insulating portion rotatably coupled to a second insulating portion by an intermediate joint.

13. The method of claim 12 further comprising the steps of:

forming the first insulating portion from a smooth insulating rod; and forming the second insulating portion from an insulating rod having sheds.

* * * * *

UNITED STATES PATENT AND TRADEMARK OFFICE
CERTIFICATE OF CORRECTION

PATENT NO. : 6,008,453
DATED : Dec. 28, 1999
INVENTOR(S) : Albert S. Richardson, Jr.

It is certified that error appears in the above-identified patent and that said Letters Patent is hereby corrected as shown below:

Claim 5, column 9, line 22, after "first insulating portion" insert ---comprising a smooth insulation rod and the second---.

Claim 8, column 9, line 60, delete "insulting" and insert ---insulating---.

Signed and Sealed this

Seventh Day of November, 2000

Attest:

Q. TODD DICKINSON

*Attesting Officer*  *Director of Patents and Trademarks*